US010938621B2

(12) United States Patent
Mishra et al.

(10) Patent No.: US 10,938,621 B2
(45) Date of Patent: Mar. 2, 2021

(54) OUT-OF-BAND MONITORING AND PROVISIONING (71) Applicant: Parallel Wireless, Inc., Nashua, NH (US)

(72) Inventors: Rajesh Kumar Mishra, Westford, MA (US); Randy Rutherford, Bedford, NH (US); Sumit Garg, Hudson, NH (US); Jitender Arora, Westford, MA (US); Babak Jafarian, Nashua, NH (US); Christopher Simmonds, Andover, MA (US)

(73) Assignee: Parallel Wireless, Inc., Nashua, NH (US)

( * ) Notice: Subject to any disclaimer, the term of this patent is extended or adjusted under 35 U.S.C. 154(b) by 80 days.

(21) Appl. No.: 16/279,601

(22) Filed: Feb. 19, 2019

(65) Prior Publication Data
US 2019/0260632 A1 Aug. 22, 2019

Related U.S. Application Data (60) Provisional application No. 62/631,595, filed on Feb. 16, 2018.

(51) Int. Cl.
*H04L 12/24* (2006.01)
*H04W 24/08* (2009.01)
*H04W 4/14* (2009.01)
*H04L 12/26* (2006.01)
*H04L 29/08* (2006.01)
*H04W 84/04* (2009.01)
(Continued)

(52) U.S. Cl.
CPC .......... *H04L 41/06* (2013.01); *H04L 41/0806* (2013.01); *H04L 43/0817* (2013.01); *H04L 43/10* (2013.01); *H04W 4/14* (2013.01); *H04W 24/08* (2013.01); *H04L 67/12* (2013.01); *H04W 84/042* (2013.01); *H04W 84/12* (2013.01); *H04W 88/08* (2013.01)

(58) Field of Classification Search
CPC ... H04W 84/20; H04W 84/045; H04W 24/08; H04W 4/14
See application file for complete search history.

(56) References Cited

U.S. PATENT DOCUMENTS

8,645,014 B1 2/2014 Kozlowski et al.
2002/0128051 A1 9/2002 Liebenow
(Continued)

Primary Examiner — Shukri Taha
(74) Attorney, Agent, or Firm — Michael Y. Saji; David W. Rouille (57) ABSTRACT A method is disclosed for out-of-band data communication with a base station in a wireless network, the method comprising: determining, at a base station in a cellular access network, the base station configured to use a coordination server and to a first core network for providing network access to user equipments (UEs), an occurrence of an event regarding a communication problem related to the base station; sending an out-of-band message, via an embedded UE module coupled to the base station attached to a second core network, to the coordination server, based on the occurrence of the event at the base station; updating, at the coordination server, a stored status for the base station, thereby enabling a status of the base station to be updated at the coordination server via an out-of-band message.

16 Claims, 6 Drawing Sheets

(51) Int. Cl.
     *H04W 84/12*     (2009.01)
     *H04W 88/08*     (2009.01)

(56) References Cited

U.S. PATENT DOCUMENTS

| | | | |
|---|---|---|---|
| 2010/0159991 A1* | 6/2010 | Fu .......................... | H04W 24/02 |
| | | | 455/561 |
| 2010/0234071 A1 | 9/2010 | Shabtay et al. | |
| 2013/0193753 A1 | 8/2013 | Brey | |
| 2015/0215832 A1* | 7/2015 | Fitzpatrick ............ | H04W 48/14 |
| | | | 455/426.1 |
| 2016/0119867 A1* | 4/2016 | Garg ................. | H04W 52/0206 |
| | | | 370/311 |
| 2017/0156169 A1* | 6/2017 | Lakshmi Narayanan .................... | |
| | | | H04L 41/0631 |
| 2020/0084711 A1* | 3/2020 | Liu ....................... | H04W 48/16 |
| 2020/0107257 A1* | 4/2020 | Ke ....................... | H04W 76/10 |

* cited by examiner

OUT-OF-BAND MONITORING AND PROVISIONING

CROSS-REFERENCE TO RELATED APPLICATIONS

This application claims the benefit of priority to U.S. Provisional Patent Application No. 62/631,595, entitled "Out-of-Band Monitoring and Provisioning," filed on Feb. 16, 2018, the entire contents of which are hereby incorporated by reference for all purposes. In addition, this application incorporates the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; U.S. patent application Ser. No. 14/183,176, entitled "Methods of Incorporating an Ad Hoc Cellular Network into a Fixed Cellular Network," filed Feb. 18, 2014; U.S. patent application Ser. No. 14/024,717, entitled "Heterogeneous Self-Organizing Network for Access and Backhaul," and filed on Sep. 12, 2013; U.S. patent application Ser. No. 14/146,857, entitled "Heterogeneous Self-Organizing Network for Access and Backhaul," and filed on Jan. 3, 2014; U.S. patent application Ser. No. 14/571,250, entitled "Virtualization of the Evolved Packet Core to Create a Local EPC," filed on Dec. 15, 2014; and; U.S. patent application Ser. No. 14/5,923,392, entitled "Out-of-Band Power Down Notification," filed on Oct. 26, 2015.

BACKGROUND

In a wireless network, a communications channel can become unavailable for a variety of reasons. Examples of situations where a communications channel may become unavailable include a situation where power may go out unexpectedly, or where a connection may be damaged or lost. When a device within a wireless network goes down, it can be difficult to determine if there was a power failure or other failure that caused the device to go down.

SUMMARY

In a first embodiment, a method may be disclosed, comprising: determining, at a base station in a cellular access network, the base station configured to use a coordination server and to a first core network for providing network access to user equipments (UEs), an occurrence of an event regarding a communication problem related to the base station; sending an out-of-band message, via an embedded UE module coupled to the base station attached to a second core network, to the coordination server, based on the occurrence of the event at the base station; updating, at the coordination server, a stored status for the base station, thereby enabling a status of the base station to be updated at the coordination server via an out-of-band message.

The event may comprise at least one of a power out condition or an interruption of a backhaul connection between the base station and the coordination server. The out-of-band message may comprise a Short Message Service (SMS) message and the out-of-band message may be sent via an SMS gateway in the second core network. The embedded UE module may be part of the base station or part of a backhaul device electrically coupled to the base station. The base station may be an LTE or 5G base station and the out-of-band message may be a 2G short message service (SMS) message.

The method may further comprise performing, between the base station and the coordination server, a secure handshake process via out-of-band messages. The method may further comprise using a hysteresis reporting window. The out-of-band message may be only sent once every predetermined time period. The method may further comprise using a Wi-Fi network to send the out-of-band message. The method may further comprise retransmitting, via out-of-band messages, data from an Internet of Things (IoT) device. The method may further comprise, in response to the occurrence of the event, instructing, via a second out-of-band message, the base station to enable a closed bubble network with a configuration previously stored at the base station. The method may further comprise sending out-of-band messages to the coordination server indicating at least one of: tampering to the base station; software license noncompliance at the base station; loss of connectivity of other base stations coupled to the base station in a mesh network; sending a periodic heartbeat message to the coordination server. The method may further comprise, in response to the occurrence of the event, reporting considerations regarding reasons the base station may be inactive. The method may further comprise, in response to the occurrence of the event, diagnosing and fixing misconfigurations. The method may further comprise, in response to the occurrence of the event, performing provisioning of identities of permitted connections.

In a second embodiment, a non-transitory computer-readable storage medium is disclosed, the medium having computer-readable code thereon for facilitating out-of-band monitoring and provisioning, the medium including instructions executable by one or more processors to perform operations, the operations comprising: determining, at a base station in a cellular access network, the base station configured to use a coordination server and to a first core network for providing network access to user equipments (UEs), an occurrence of an event regarding a communication problem related to the base station; sending an out-of-band message, via an embedded UE module coupled to the base station attached to a second core network, to the coordination server, based on the occurrence of the event at the base station; updating, at the coordination server, a stored status for the base station, the instructions thereby enabling a status of the base station to be updated at the coordination server via an out-of-band message. The event may comprise at least one of a power out condition related to the base station or a lost connection between the base station and another device. The medium may include instructions for performing operations. The out-of-band message may comprise a Short Message Service (SMS) message.

In a third embodiment, a method for providing out-of-band monitoring and provisioning includes determining, in a wireless system including a Converged Wireless System (CWS) in communication with a HetNet Gateway (HNG), a BackHaul Module (BHM) and a Small Message System (SMS) server, an occurrence of an event regarding a communication problem between the CWS and the HNG. The method further includes sending, by the BHM, an out of band message regarding the occurrence of the event to the HNG. The event may be at least one of a power out condition related to the CWS or a lost connection between the CWS and the HNG. The out of band message comprises an SMS message sent to the HNG by the BHM.

In a fourth embodiment, a system for providing out-of-band monitoring and provisioning includes a Converged Wireless System (CWS) in communication with a HetNet Gateway (HNG), a BackHaul Module (BHM) and a Small Message System (SMS) server. An event occurs regarding a communication problem between the CWS and the HNG. In response to the event, the BHM sends an out of band message regarding the occurrence of the event to the HNG. The event may be at least one of a power out condition related to the CWS or a lost connection between the CWS and the HNG. The out of band message comprises an SMS message sent to the HNG by the BHM.

In a fifth embodiment, a non-transitory computer readable storage medium having computer readable code thereon for providing out-of-and provisioning is described. The medium includes instructions executable by the processor to perform operations including determining an occurrence of an event regarding a CWS and an HNG. The medium further includes instructions for sending an out of band message regarding the occurrence from a BHM in communication with a CWS to the HNG. The event may be at least one of a power out condition related to the CWS or a lost connection between the CWS and the HNG. The out of band message comprises an SMS message sent to the HNG by the BHM.

DETAILED DESCRIPTION

In an example embodiment a wireless system includes a multi-RAT node (e.g., a Converged Wireless System (CWS)) in communication with a HetNet Gateway (HNG), which is in communication with a core network. The multi-RAT node may include or be in communication with a Back Haul Module (BHM). The BHM includes a Wi-Fi radio, a cellular radio and a battery.

A multi-Radio Access Technology (RAT) node delivers instant, reliable and cost-effective coverage anywhere and features 3G, 4G/LTE/5G and Wi-Fi. The multi-RAT node may include built-in flexible backhaul: Fiber, Ethernet, LTE Backhaul, multi-radio mesh Software-Defined Networking (SDN) backhaul enabled by HetNet Gateway for enabling a mesh RAN. The CWS leverages open APIs on HNG. The nodes are self-configured and self-managed via HNG and can be deployed easily. HNG-enabled orchestration provides hands-free maintenance of CWS base stations.

In a wireless network, the HetNet Gateway (Parallel Wireless HNG) node logically and physically sits between the multi-RAT node and Evolved Packet Cores (EPCs). It orchestrates and concentrates thousands of base stations and presents itself as a single "base station" or base station controller (in 2G: BSC, 3G: RNC, 4G: eNB) to the MNO packet core. The Parallel Wireless HNG virtualizes the radio network resources such as CWSs and backhaul and makes them self-configurable and self-adjustable. It acts as HeNBGW and vRAN/virtual eNB. It allows plug and play operation of CWS nodes and mesh backhaul and allows them to form an ad hoc network as the nodes come in to the network and leave. In a 3G network, the Parallel Wireless HNG provides the Home Node B Gateway and virtual RNC functionality. For Wi-Fi, the Parallel Wireless HNG acts as a Wireless LAN Controller (WLC), Evolved Packet Data Gateway (ePDG) and Trusted Wireless Access Gateway (TWAG). These are all configurable options and one or the other can be configured based on an operator's requirements. In some configurations Parallel Wireless HNG also acts as an EPC. The HetNet Gateway sits between the RAN and the core network, and as a result is in a position to provide proxying and virtualization for any-G and for any core or multiple cores, as well as being able to perform deep packet inspection and lawful intercept for data flowing through the network that would be encrypted if intercepted at a different point in the network.

The Parallel Wireless Converged Wireless System, otherwise known as the Parallel Wireless base station or the Converged Wireless System (CWS)™, is a multi-RAT base station with LTE, Wi-Fi, and 3G technologies that provides a flexible outdoor and in-vehicle solution in conjunction with the Parallel Wireless HNG. The combined system is a cloud-based network orchestration system that maximizes virtualization, and functions in a 3GPP standards-based Heterogeneous Network (HetNet) to bring 3G, Wi-Fi and 4G operators better technology at lower cost. The Parallel Wireless solution addresses key challenges in delivering 3G/4G coverage, capacity, and quality of service (QoS), regardless of the cell size, e.g., femtocell, pico cell, micro cell, metro cell, or macro cell. The Parallel Wireless solution is also easy to deploy with automated configuration and ongoing optimization. The CWS may also be referred to as eNodeB, NodeB, Home NodeB (HNB), Evolved-HNB (eHNB), base station, in-vehicle base station, etc. in this disclosure. In this disclosure where a base station is mentioned, depending on the context an in-vehicle base station or the Parallel Wireless CWS may also be understood to be identified, and the features thereof may be understood to pertain to the described embodiment.

HNG is software platform that disaggregates hardware and software creating a unified architecture across 2G/3G/4G/5G. This abstraction of Radio Area Network (RAN) and core network functions on a COTS server results in heterogeneity across RAN and core enabling interop between all vendors and allowing to modernize networks or select best of breed for future ones. The HNG provides real-time responsiveness to subscriber needs through edge-centric architecture to deliver the best performance for voice and data, outdoors or indoors, across 2G/3G/4G/5G to reduce subscriber churn.

A problem is as follows. Suppose we lose power. In traditional network, you could use a UPS, perform notification via SMS. But in rural deployments, there is a large number of outages. ~1/week. This problem will scale up massively as we roll out to more sites. OR suppose we have a fiber cut. When a CWS goes down, we can't tell whether it is power or backhaul. HNG sees it but we don't get service. Expensive in dollars and human time to figure out that we had a power failure. Typically even once we think this is a power outage, we want to independently verify. With a power failure, what we do now is nothing. Wait for it to come back up.

The inventors have appreciated that we have a backhaul module with UE capability; RAT-agnostic (2G/3G/4G/LTE/

LTE-A/5G/Wi-Fi); including 2G capability. 2G has much greater coverage than LTE, especially compared to our LTE and mesh nodes, but limited throughput and data capability. Therefore, we can send an SMS to a gateway that will eventually get back to our HNG.

Any low-bandwidth data message could use this 2G channel. We could use SMS control channel (PCCH? BCCH? more robust) or GPRS data, depending on what is available. A 20-30 mile away macro could handle. Could be an interactive protocol with ACK, flow control; Alternatively, any RAT or mode of comm's could be used. TVWS, Wi-Fi mesh, 2G (EDGE, GPRS, etc.)/3G/4G/5G, etc. could be used. If a higher-bandwidth link is available, we can set up a full IPsec tunnel and send higher-bandwidth data.

Advantages include: Out of band; Little additional cost, since we have a UE module in our CWS and/or BHM; Greater range, since 2G SMS goes 12 km to macro. Two main classes of functionality: Monitoring; Provisioning. To implement, SMS gateway has to talk back to the HNG, because HNG provides bulk of provisioning features.

A virtualizing gateway/management gateway is provided that is organized in a hierarchical architecture to enable global NOC management. HNG coordinates the CWS nodes it is responsible for; HNGs can coordinate with each other in a multiple level hierarchy to manage large numbers of CWSes. To communicate, the HNG could use a single SMS gateway; unlikely the SMS GW will be a bottleneck. Or, the HNG could use multiple SMS GWs to reach CWSes on different 2G operator networks.

Security would be the main concern on the use of such an out of band channel. You don't want to permit anyone to reboot your device remotely via SMS. Therefore, handshake (e.g., CHAP); encryption; multiple messages to be combined; originating SMS ID; shared secret could be used. Stingray avoidance becomes important as we look at 2G. May require over-the-top (OTT) security.

Event reporting and general event reporting could be provided, not just for power failures. Hysteresis to control the reporting window, so that you don't over-report and overwhelm the SMS GW.

Monitoring use cases include: Store and forward; Intentionally: for some reason I don't want to send now. Save battery, weak security over 2G. (Discuss stingray avoidance); Unintentionally: send all queued data; Could be useful as IOT gateway; Timing embedded into message we sent so we can contextualize; Make a report once the connection is later made.

In some embodiments this could enable a closed bubble network. Bubble network: one or more CWS nodes that are connected in a mesh and that do not have a route to the HNG or Internet. Possible with embedded EPC. Report that a bubble is up even if you are not able to connect backhaul. In some cases you might purposely cut a backhaul link and attempt to maintain connections with all UEs, such as in a Stingray operating scenario or in a battlefield scenario.

Another use case could be license key monitoring. Heartbeat would be useful in this case. Heartbeat is not useful for non-bubble (connected) network because you already know it is up. You can report GPS coords, # users, license, etc. Valuable to HQ. Another use case could be tamper detection, even without ethernet, could be provided. Unplugged cable? Opened case? Another use case could be, base station has been taken outside of geofence, no GPS available, but we see different PLMNs or PCIs show up? Another use case could be, base station not active because still too cold and waiting to warm up; could report temperature.

You may want to have provisioning. Provisioning use cases include: Fix misconfigurations, to enable comm's with HNG; Provisioning of identities of permitted connections, such as in a bubble network; IMSI or SIM or other HSS/HLR information or messaging.

IOT is low-bandwidth data amenable to store and forward, and is a use case. Could work with bubble networks or could be an overlay/underlay network. Underlay network: use 2G as one more RAT to enable timely delivery of IOT data during congestion of primary backhaul.

As another alternative, Connect to an unsecured Wi-Fi network via the Wi-Fi mesh module, and use that as backhaul. Network operators and cable operators often operate publicly-available Wi-Fi networks, e.g., "xfinity." The Wi-Fi module could be used to create an out-of-band Internet connection, and any available mechanism to send any pertinent data could be used. The links could be prioritized. It is desirable to include current power source status in the prioritization, for example, battery backup could be used to send data via a 2G UE but it is reasonable to not use Wi-Fi, as building Wi-Fi would be expected to go out in case of a power outage.

SMS can be used for any and all of the following: Generalized two-way comm's. Two-way protocol. Send, ack. Handshaking security may be enabled. Any new protocol could be implemented on top of legacy SMS technology using this two-way general comm's channel. Relying on 2G SMS gateway is possible. In some cases, cooperation with operator may not be needed if we use standard IP SMS gateway.

There are at least 3 deployment scenarios: a CWS base station; an in-vehicle base station; or, a base station plus a separate backhaul module or BHM (including 2G UE, 4G UE, Wi-Fi, etc.). Assume BHM has battery and CWS does not. Any or all of the above may have battery backup, but this may have very limited backup time. The OS can detect when power loss occurs and knows the level of charge left in the battery.

Mesh management could be a use case. Power goes out; 10 secs of battery left—then we would notify any nodes connected by mesh. Similar to LMLTE/first responder battery fail notification (when power is about to go out at mobile CWS, alert all attached UEs before going down). Different when a CWS goes down which is a gateway, versus a CWS that is a non-gateway node.

When CWS and BHM independent operation is available, the BHM is able to monitor the CWS. Scenario: CWS goes down or into a loop (hangs); The connected BHM can independently recognize this and: Send a hardware reboot message via AISG or other hardware bus; and Send messages to peer CWS/BHM nodes and/or HNG to inform them that this node is down. This can hard reboot the CWS. At a very low level. Detect whether they are shorted together or not. AISG connector, some voltages X and Y. This is a generalized alarm interface. Can use this to perform hardware resets. Support external AISG devices, such as other devices on the cell tower. Or support other hardware devices and protocols, Factory reset, Self destruct (re tamper), etc. Idea is that the high-speed interface between CWS and BHM is not used to perform these functions. Because CWS is unresponsive.

In a further embodiment, power event throttling can be enabled. Battery backup does not last forever. When we have a power event, we can throttle data use over 2-way SMS comm's, which will save battery. We can provide fine-grained throttling because we know exactly what the data use is being requested for, e.g., permit only 911/999 (emergency) calls, for example, or only 2G uplink, or only 3G uplink. Out of band provisioning can be used to manage this. This is helpful in the "bubble network" scenario, when 2G SMS or GPRS is available. Advantages could include: Extend battery life; Permit low-data rate store and forward.

Figure 1:
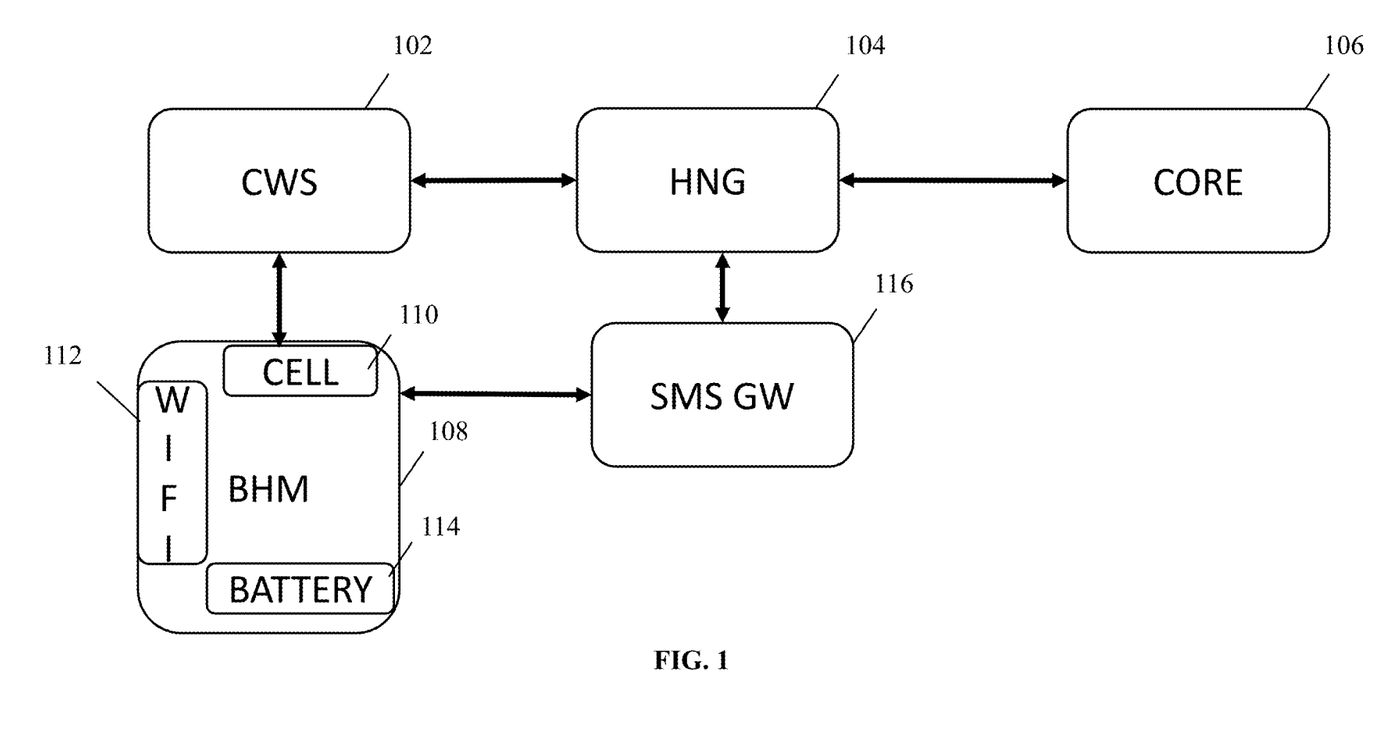
FIG. 1 is a schematic diagram of a wireless network architecture, in accordance with some embodiments.

Referring to FIG. 1, a block diagram of a particular embodiment of a system 100 useful for out-of-band monitoring and provisioning is shown. System 100 includes a CWS 102 in communication with an HNG 104, which is in communication with a core network 106. Also shown is a BHM 108 in communication with the CWS 102. The BHM 108 includes a cellular radio 110, a Wi-Fi radio 112 and a battery 114.

Figure 2:
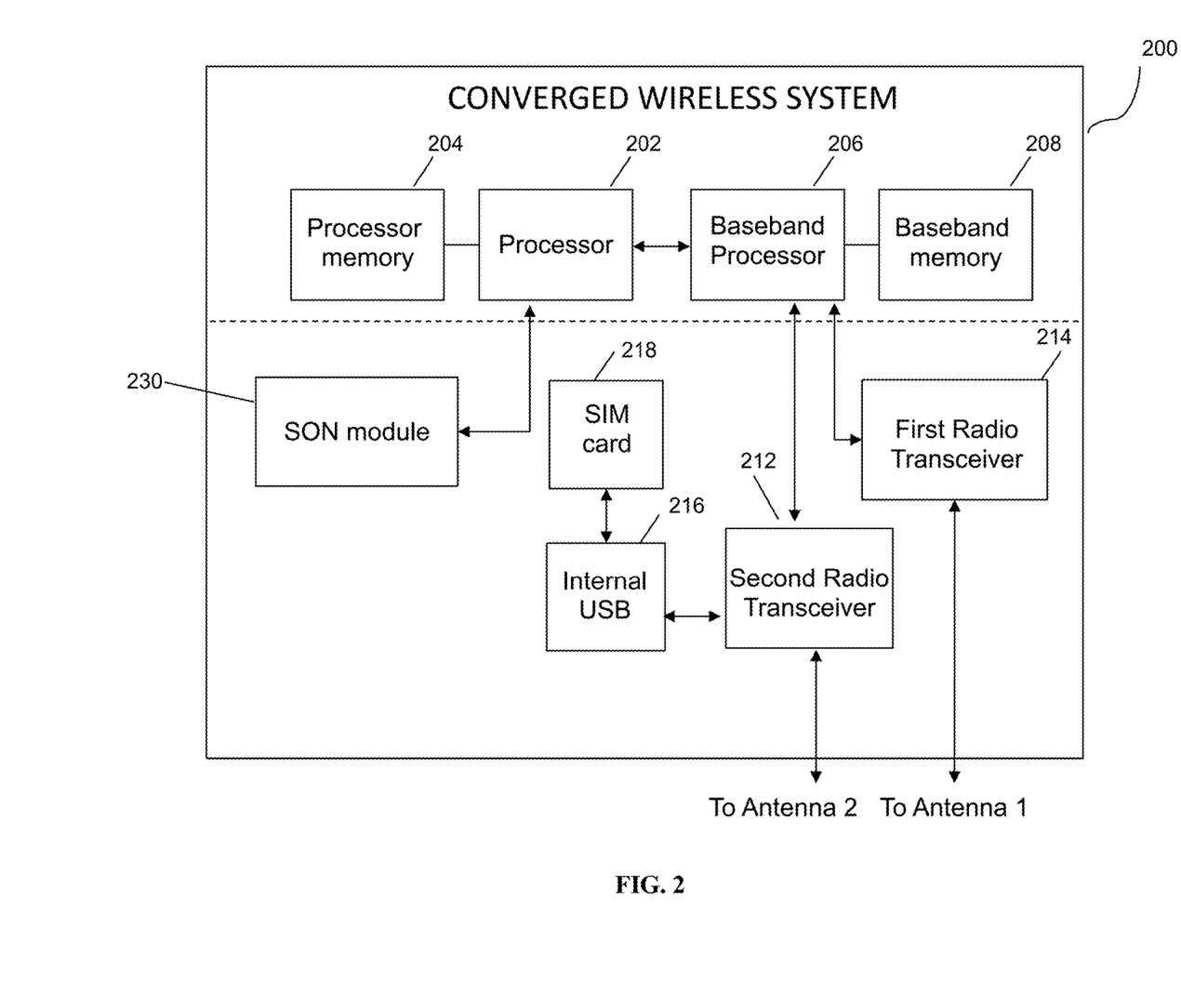
FIG. 2 is a schematic diagram of an exemplary base station, in accordance with some embodiments.

FIG. 2 is a schematic diagram of a wireless base station 200, in accordance with some embodiments. CWS 200 is an enhanced multi-radio access technology (multi-RAT) base station that may include processor 202, processor memory 204 in communication with the processor, baseband processor 206, and baseband processor memory 208 in communication with the baseband processor. CWS 200 may also include first radio transceiver 210 and second radio transceiver 212, internal universal serial bus (USB) port 216, and subscriber information module card (SIM card) 218 coupled to USB port 214. In some embodiments, the second radio transceiver 212 itself may be coupled to USB port 216, and communications from the baseband processor may be passed through USB port 216. A self-organizing network (SON) module 230 may also be included, which may include a database (not shown), in some embodiments, or which may be in communication with a coordination server (not shown), in some embodiments, or both, in some embodiments.

Processor 202 and baseband processor 206 are in communication with one another. Processor 202 may perform routing functions and may determine if/when a switch in network configuration is needed. Baseband processor 206 may generate and receive radio signals for both radio transceivers 210 and 212, based on instructions from processor 202. In some embodiments, processors 202 and 206 may be on the same physical logic board. In other embodiments, they may be on separate logic boards.

The first radio transceiver 210 may be a radio transceiver capable of providing LTE eNodeB functionality and may be capable of higher power and multi-channel OFDMA. The second radio transceiver 212 may be a radio transceiver capable of providing LTE UE functionality. Both transceivers 210 and 212 are capable of receiving and transmitting on one or more LTE bands. In some embodiments, either or both of transceivers 210 and 212 may be capable of providing both LTE eNodeB and LTE UE functionality. Transceiver 210 may be coupled to processor 202 via a Peripheral Component Interconnect-Express (PCI-E) bus, and/or via a daughtercard. As transceiver 212 is for providing LTE UE functionality, in effect emulating a user equipment, it may be connected via the same or different PCI-E bus, or by a USB bus, and may also be coupled to SIM card 218.

SIM card 218 may provide information required for authenticating the simulated UE to the evolved packet core (EPC). When no access to an operator EPC is available, a local EPC on the enhanced eNodeB itself (not shown) may be used, or another local EPC on the network may be used. This information may be stored within the SIM card and may include one or more of an international mobile equipment identity (IMEI), international mobile subscriber identity (IMSI), or another parameter needed to identify a UE. Special parameters may also be stored in the SIM card or provided by the processor during processing to identify to a target eNodeB that device 200 is a CWS.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 210 and 212, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 202 for reconfiguration.

Processor 202 may identify the appropriate network configuration, and may perform routing of packets from one network interface to another accordingly. Processor 202 may use memory 204, in particular to store a routing table to be used for routing packets. Baseband processor 206 may perform operations to generate the radio frequency signals for transmission or retransmission by both transceivers 210 and 212. Baseband processor 206 may also perform operations to decode signals received by transceivers 210 and 212. Baseband processor 206 may use memory 208 to perform these tasks.

A problem with a wireless network can occur when power is lost or a connection fails. In conventional systems, a power fail can be mitigated, at least in part, by use of an Uninterruptible Power Supply (UPS), and notification of the power fail can be sent by Short Message Service (SMS) messaging. This solution become problematic when the system scales to a larger number of sites. When a CWS goes down, it can be difficult to determine whether the cause is a power failure, a backhaul failure, or other type of failure.

The network includes a backhaul module 108 with UE capability. The backhaul module may be RAT agnostic. An SMS message can be sent to a gateway that will eventually make it to the HNG. This is a low-bandwidth data message that could use a 2G channel or an SMS control channel or other data, dependent on what is available. Alternatively, any RAT or mode of communication could be used, including an interactive protocol with acknowledgements (ACK) and flow control. The modes of communication that could be used include but are not limited to Television White Space (TVWS), Wi-Fi mesh, 2G (EDGE, GPRS, etc.)/3G/4G/5G, etc. When a higher-bandwidth link is available, a full IPsec tunnel can be set up and higher-bandwidth data can be sent.

There are several advantages associated with this type of implementation. These advantages include that the communications are out of band. Another advantage is that there is little additional cost to implement, since there is a UE module in the CWS and/or BHM. Yet another advantage is greater range, since 2G SMS can extend to 12 km to macro.

The presently described method and systems can be used for multiple purposes, including monitoring and provisioning. The SMS gateway is required to communicate with the HNG since the HNG provides most of the provisioning features. The HNG coordinates the CWS nodes it is responsible for. HNGs can coordinate with each other in a multiple level hierarchy to manage large numbers of CWSs. A single SMS gateway could be used as it is unlikely the SMS GW will be a bottleneck. Multiple SMS GWs could be used to reach CWSs on different 2G operator networks.

Security can be achieved by use of handshakes (e.g., CHAP), encryption, combining multiple messages, using the originating SMS ID or a shared secret. Stingray avoidance may require over-the-top (OTT) security.

The system can be used to provide general event reporting, and is not limited to reporting only power failures. Hysteresis can be used to control the reporting window, so that an incident is only reported once during a predetermined time period so the SMS GW is not overwhelmed.

The system may further be used for monitoring use cases. One example is for store and forward operations. Store and forward operations may be used for a variety of reasons. One reason is to use this intentionally wherein there is a desire to refrain from sending now. This may be useful, for example, for saving battery life or if there are concerns regarding weak security over 2G. Another reason is to use this unintentionally to send all queued data. This could be useful as an IOT gateway or for timing embedded into message that is sent so that the message can be contextualized. This may also be used to make a report once the connection is later made. Another monitoring use case is to enable a closed bubble network, tamper detection and reporting of other considerations.

The system may also be used for provisioning use cases. This would include fixing misconfigurations to enable communications with the HNG. The system could also provide provisioning of identities of permitted connections, such as in a bubble network. This could include International Mobile Subscriber Identity (IMSI), or SIM or other HSS/HLR information or messaging. There may be some scenarios where a person might purposely cut a backhaul link and attempt to maintain connections with all UEs, such as in a Stingray operating scenario or in a battlefield scenario.

IOT may also be a use case. IOT uses low-bandwidth data and is amenable to store and forward operation. This could also be used with bubble networks or could be an overlay/underlay network, wherein 2G is used as one more RAT to enable timely delivery of IOT data during congestion of primary backhaul.

There are several alternate uses for the out of band monitoring and provisioning. This could be used for over the air provisioning. For example, if a user had an expired certificate, SMS could be used in order to set up an out of band channel to transmit the new certificate. The system could also be used for diagnostics, supervisor commands or other alternatives. The system could be used to connect to an unsecured Wi-Fi network via the Wi-Fi mesh module, and use that as backhaul.

The out of band monitoring and provisioning system can be used for mesh management. For example, if power goes out and there is a limited amount of battery power left, the system can notify any nodes connected by mesh. This is similar to LMLTE/first responder battery fail notification (when power is about to go out at mobile CWS, alert all attached UEs before going down). This is different when a CWS goes down which is a gateway, versus a CWS that is a non-gateway node.

The out of band monitoring and provisioning system can be used for CWS and BHM independent operation. For example, if the CWS goes down or into a loop (hangs), the connected BHM can independently recognize this and send a hardware reboot message via Antenna Interface Standards Group (AISG) protocol or other hardware bus and send messages to peer CWS/BHM nodes and/or HNG to inform them that this node is down.

The system can also perform a hardware reboot from BHM/remote power down message resulting in a hard reboot of the CWS. The system may also perform a factory reset or a self-destruct.

Figure 3:
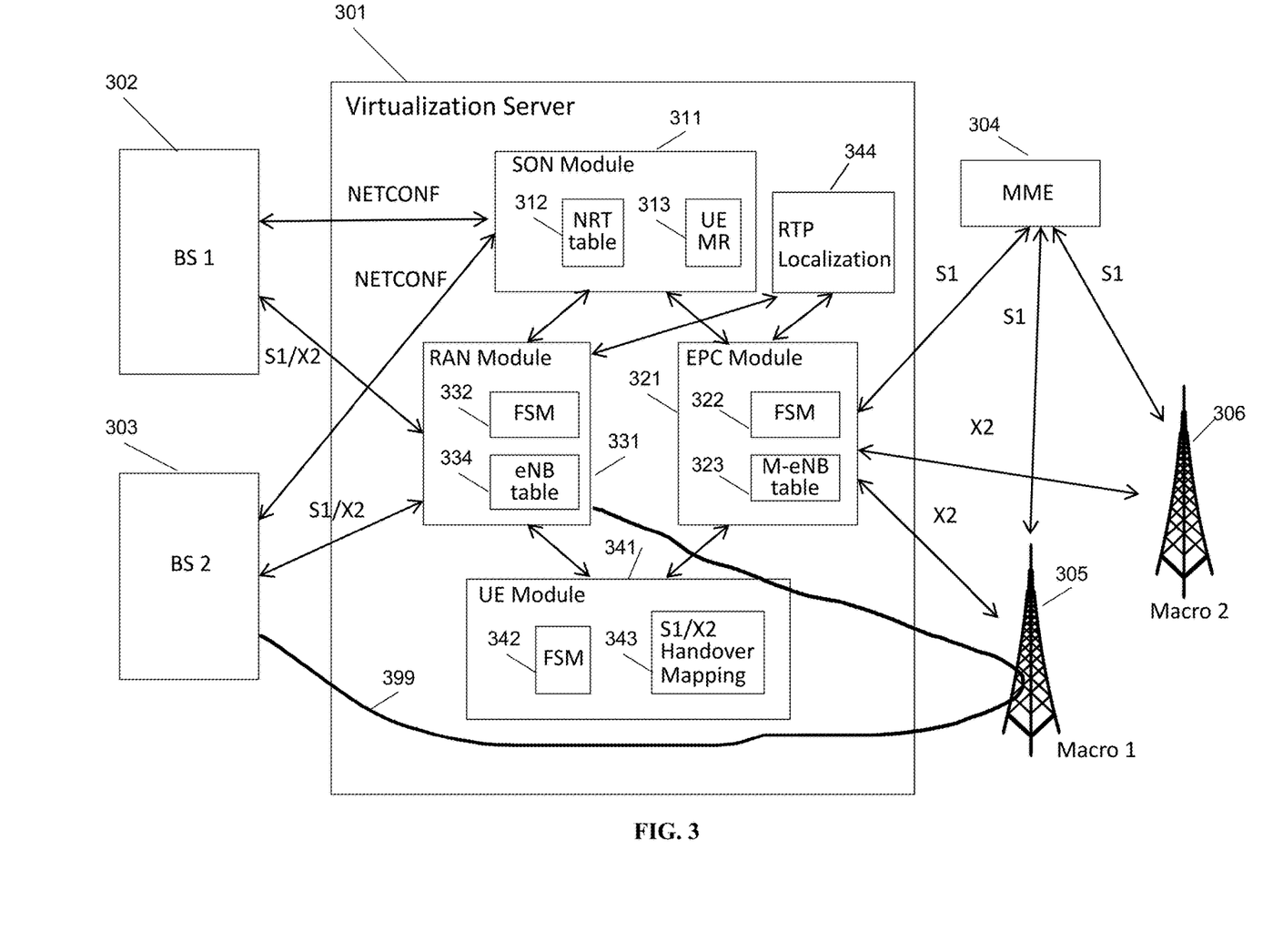
FIG. 3 is a schematic architecture diagram of an exemplary gateway, in accordance with some embodiments.

The system may additionally be used for power event throttling. This can be beneficial when there is a power outage and, even though there is battery backup, the battery will eventually run out. When there is a power event, data use can be throttled, which will save battery power. Fine-grained throttling can be performed because it is known exactly what the data use is being requested for. In one example, only 911/999 (emergency) calls are permitted, or only 2G uplink, or only 3G uplink. Out of band provisioning can be used to manage this. This is helpful in a bubble network scenario, when 2G SMS or GPRS is available, to extend battery life and to permit low-data rate store and forward FIG. 3 is a schematic diagram of a base station management gateway in a Long Term Evolution (LTE) architecture, in accordance with some embodiments. Base station management server 301 provides services to, and is coupled to, eNodeB 1 302 and eNodeB 3 303, on a RAN side of a network (i.e., inside of the gateway). Base station management server 301 provides services to, and is coupled to, MME 304, macro eNodeB 305, and macro eNodeB 306, on a core network side of the network (outside of the gateway). Base station management server 301 corresponds to LAC 110, in some embodiments. Here, base station 303 is shown as communicating via an out-of-band channel 399 to RAN module 331 via macro 305.

Within base station management gateway 301 are self-organizing network (SON) module 311, containing neighbor relation table (NRT) 312 and UE measurement report processing module 313; evolved packet core (EPC) module 321, containing EPC finite state machine module 322 and macro eNodeB table 323; radio access network (RAN) module 331, containing eNodeB finite state machine module 332 and eNodeB table 334; and user equipment (UE) module 341, containing UE finite state machine module 342 and S1/X2 handover mapping table 343. Each of modules 311, 321, 331, and 341 are coupled to each other within base station management gateway 301, and may execute on one or more shared processors (not shown) coupled with memory (not shown).

In some embodiments, SON module 311 may perform NRT maintenance, load information processing and fractional frequency reuse (FFR) processing; RAN module 331 may perform X2 association management with eNodeBs 302, 303; EPC module 321 may perform X2 association management with macro eNodeBs 305, 306; and UE module may perform X2 handover and S1/X2 translation between eNodeBs 302, 303 and macro eNodeBs 305, 306. All the above managers/modules interact with each other to accomplish the assigned functionality.

Figure 4:
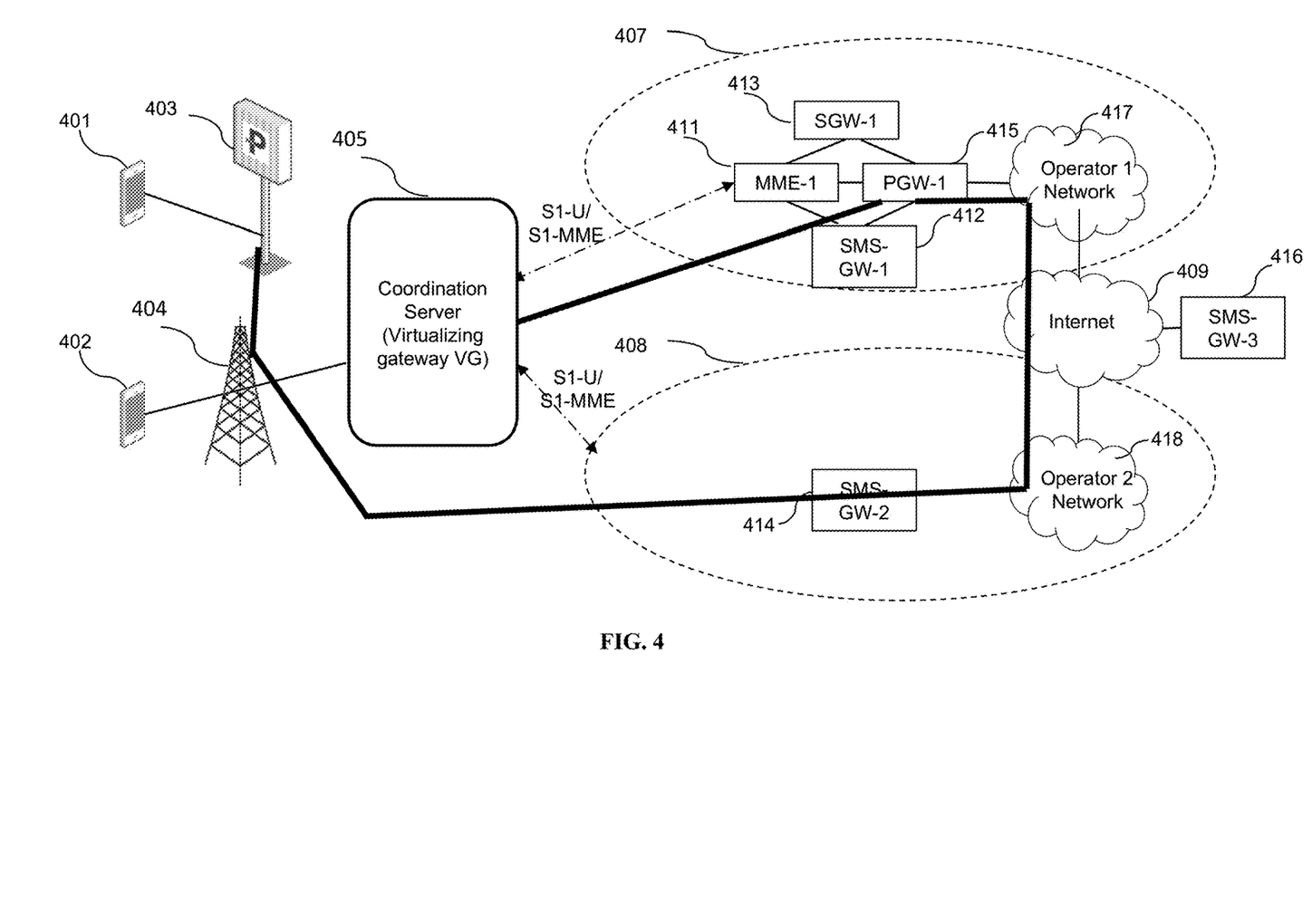
FIG. 4 is a further schematic diagram of a wireless network architecture, in accordance with some embodiments.

FIG. 4 depicts a network diagram of an LTE wireless network, in accordance with some embodiments. The wireless network depicted shows a UE 401 attached to a base station 403, which is intended to be managed and is ordinarily connected to a coordination server 403. Also attached is another UE 402, attached to a base station 404, also connected to the coordination server 405. Base stations 403 and 404 are eNodeBs. The UEs are ordinary UEs. The coordination server 405 acts as a gateway between base stations 403 and 404 and any core network, such as core network 407. Coordination server 405 is also connected to a configuration server 406, in certain embodiments. The coordination server 405 is a virtualizing gateway (VG) as described herein, and virtualizes base stations 403, 404 from the core network. For example, VG 405 is configured to act as a back-to-back user agent to virtualize signaling between the eNodeB and the core network.

Each network has an SMS gateway, enabling SMSes to be sent into and out of each network. SMS-GW-1 412 provides SMS service to network 407. SMS-GW-2 412 provides SMS service to network 414. SMS-GW-3 416 is another SMS gateway out on the public Internet for another network, not shown.

VG 405 may be in communication with more than one core network. As shown, VG 405 is in communication with core network 407 and with core network 408. Either or both of the eNodeBs 403, 404 may be shared by one or both of core network 407 and 408. For example, base station 403 may be used exclusively by core network 407, in which case base station 403 may be represented by VG 405 as a virtual eNodeB to mobility management entity (MME) 411, serving gateway (SGW) 413, packet data network gateway (PGW) 415, and through PGW 415, operator 4 packet data network 417, together comprising certain components of core network 407. Base station 403 may also be shared by both of core networks 407 and 408, in which case core networks 407 and 408 see different, virtualized eNodeBs, and another virtualized eNodeB may be used by VG 405 to represent base station 403 to core network 408, including MME-2 412, SGW-2 414, PGW-2 416, and operator 2 network 418. Typically, packet data networks 417 and 418 of the different operators are connected via the public Internet 409. Similarly, base station 404 may be virtualized by VG 405 to core networks 407, 408, or both.

In operation, base station 403 needs to communicate with VG 405, but it is unable to do so or has otherwise determined that an out-of-band connection is suitable, as there is no connection directly between base station 403 and VG 405. Base station 403 has a UE module that allows it to attach to macro 404, and base station 403 thereby creates a data connection via base station 404, SMS-GW-2 414, operator 2 network 418, Internet 409, operator 1 network 417, and PGW 415.

Figure 5A:
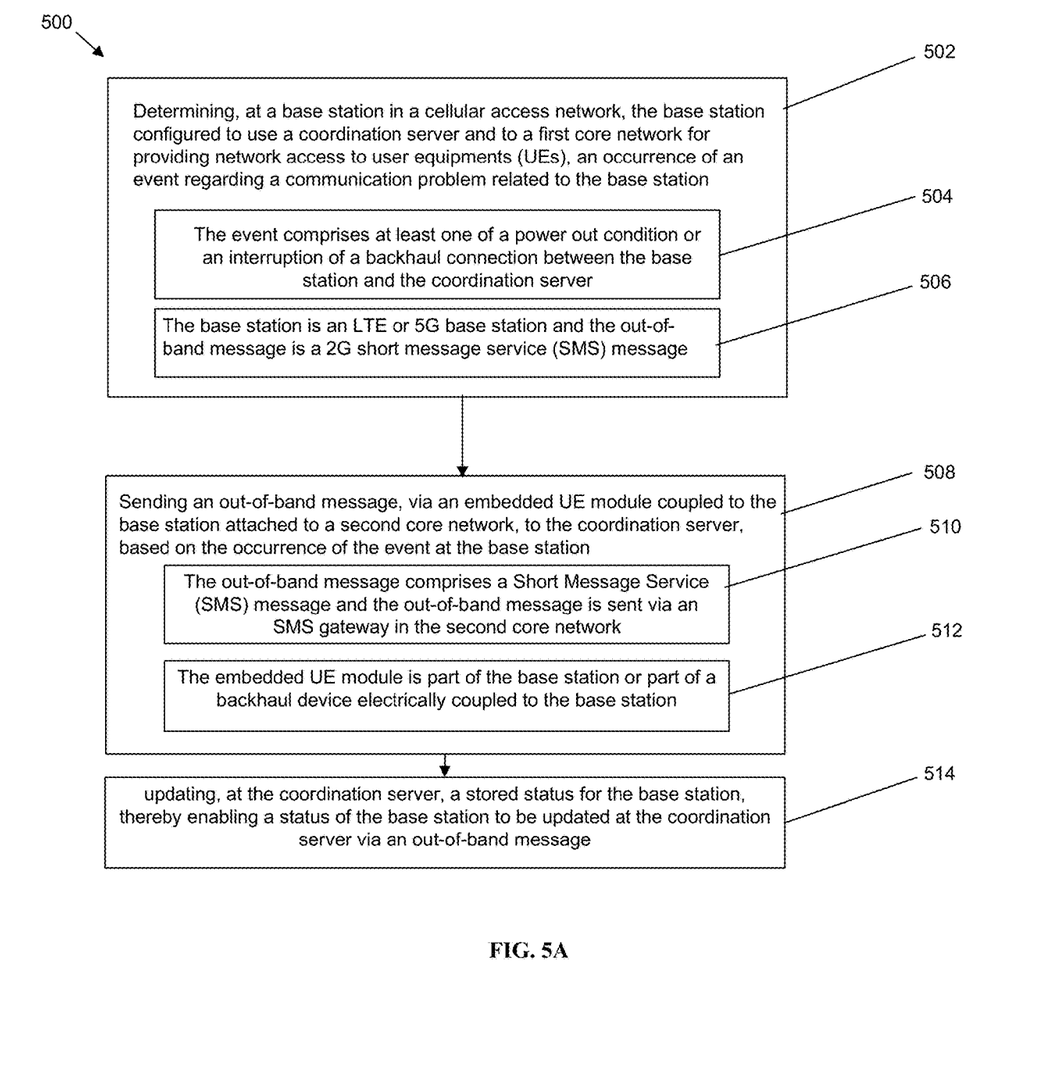
FIGS. 5A and 5B are a flowchart of an out-of-band notification procedure, in accordance with some embodiments.
Figure 5B:
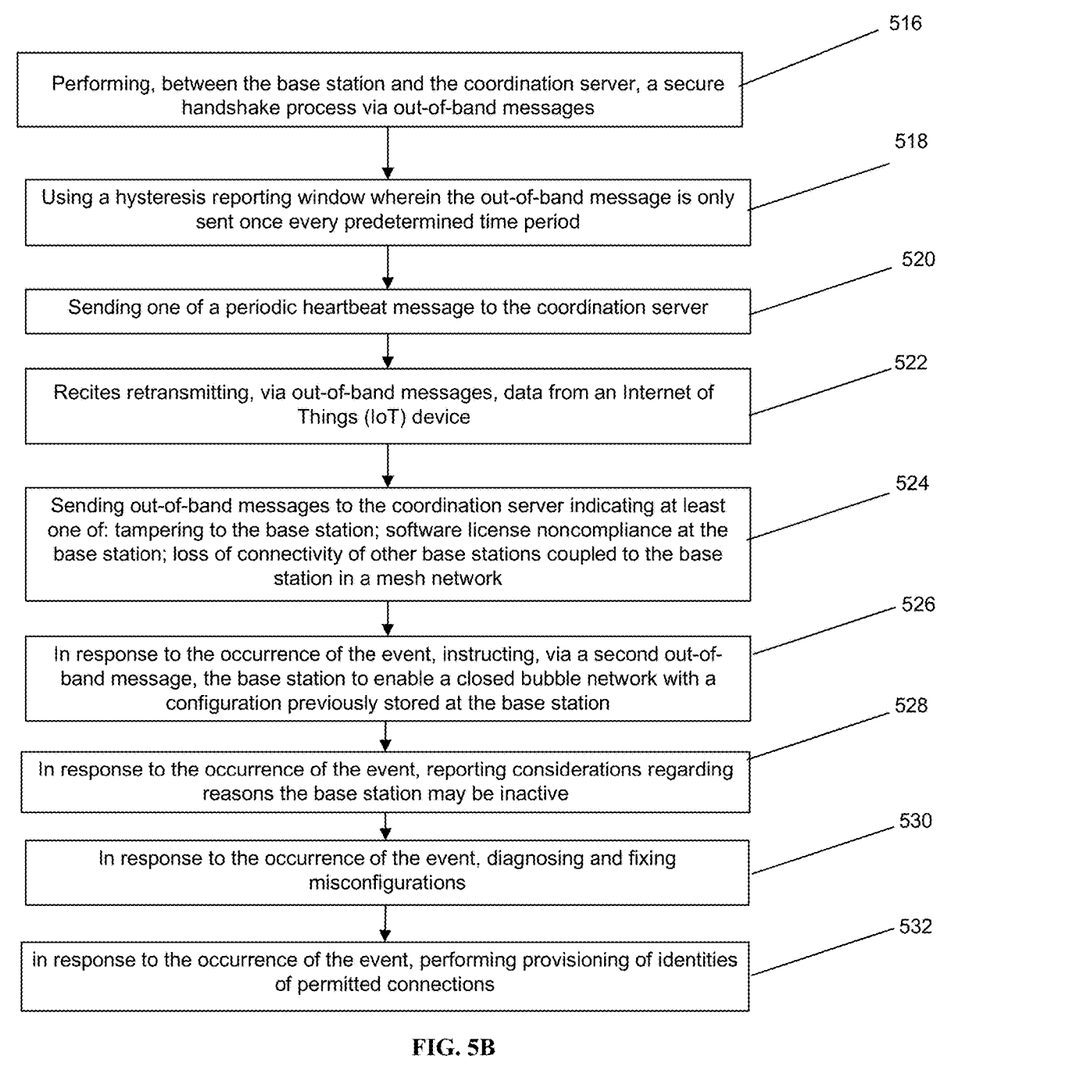

Flow charts of particular embodiments of the presently disclosed methods are depicted in FIGS. 5A and 5B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language or hardware implementation. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 5A and 5B, an example embodiment of a method 500 for performing out-of-band provisioning is shown. Method 500 begins with processing block 502 which discloses determining, in a wireless system including a Converged Wireless System (CWS) in communication with a HetNet Gateway (HNG), a BackHaul Module (BHM) and a Small Message System (SMS) server, an occurrence of an event regarding a communication problem between the CWS and the HNG. As shown in processing block 504, in one embodiment the event comprises at least one of a power out condition related to the CWS or a lost connection between the CWS and the HNG.

Processing block 506 states sending, by the BHM, an out of band message regarding the occurrence of the event to the HNG. Processing block 508 recites the out of band message comprises an SMS message sent to the HNG by the BHM. Processing block 510 discloses the out of band message is sent using one of Television White Space (TVWS), Wi-Fi mesh, 2G, 5G, 4G, 5G. Processing block 512 shows the out of band message is sent to the HNG using security. Processing block 514 recites the out of band message is sent using an Internet Protocol (IP) sec tunnel.

Processing continues with processing block 516 which discloses using, by the BHM, a hysteresis reporting window wherein the out of band message is only sent once every predetermined time period.

Processing block 518 states in response to the occurrence of the event, storing data and forwarding the data at a later time. As shown in processing block 520, the data is data from an Internet of Things (IoT) device.

There are several actions which may be taken in response to the occurrence of the event. Processing block 522 recites in response to the occurrence of the event, enabling a closed bubble network. Processing block 524 discloses in response to the occurrence of the event, performing tamper detection. Processing block 526 states, in response to the occurrence of the event, reporting considerations regarding reasons the CWS may be inactive. Processing block 528 recites, in response to the occurrence of the event, diagnosing and fixing misconfigurations. Processing block 530 discloses, in response to the occurrence of the event, performing provisioning of identities of permitted connections.

The foregoing discussion discloses and describes merely exemplary embodiments of the present invention. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

The above-described features and applications can be implemented as software processes that are specified as a set of instructions recorded on a computer-readable storage medium (also referred to as computer readable medium).

When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The subject matter described in this specification can be implemented using client-side applications, web pages, mobile web pages, or other software as generally known in the art and that would be usable to end-user customers (for community self-managed RAN apps) and/or mobile operator end users. The subject matter could alternately be delivered or implemented using an API, such as a SOAP API, a JSON API, a RESTful API, in lieu of or in conjunction with a direct end-user interface. The subject matter could use messaging queues, webhooks, server-side containers, or any other technology known in the art.

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method, comprising:
   determining, at a base station in a cellular access network, the base station configured to use a coordination server and a first core network for providing network access to user equipments (UEs), an occurrence of an event regarding a communication problem related to the base station;
   sending an out-of-band message, via an embedded UE module coupled to the base station attached to a second core network, to the coordination server, based on the occurrence of the event at the base station;
   updating, at the coordination server, a stored status for the base station,
   thereby enabling a status of the base station to be updated at the coordination server via an out-of-band message; and
   in response to the occurrence of the event, instructing, via a second out-of-band message, the base station to enable a closed bubble network with a configuration previously stored at the base station.

2. The method of claim 1, wherein the event comprises at least one of a power out condition or an interruption of a backhaul connection between the base station and the coordination server.

3. The method of claim 1, wherein the out-of-band message comprises a Short Message Service (SMS) message and the out-of-band message is sent via an SMS gateway in the second core network.

4. The method of claim 1, wherein the embedded UE module is part of the base station or part of a backhaul device electrically coupled to the base station.

5. The method of claim 1, wherein the base station is an LTE or 5G base station and the out-of-band message is a 2G short message service (SMS) message.

6. The method of claim 5, further comprising performing, between the base station and the coordination server, a secure handshake process via out-of-band messages.

7. The method of claim 1, further comprising using a hysteresis reporting window wherein the out-of-band message is only sent once every predetermined time period.

8. The method of claim 1, further comprising using a Wi-Fi network to send the out-of-band message.

9. The method of claim 8, further comprising retransmitting, via out-of-band messages, data from an Internet of Things (IoT) device.

10. The method of claim 1, further comprising sending out-of-band messages to the coordination server indicating at least one of: tampering to the base station; software license noncompliance at the base station; loss of connectivity of other base stations coupled to the base station in a mesh network; sending a periodic heartbeat message to the coordination server.

11. The method of claim 1, further comprising, in response to the occurrence of the event, reporting considerations regarding reasons the base station may be inactive.

12. The method of claim 1, further comprising, in response to the occurrence of the event, diagnosing and fixing misconfigurations.

13. The method of claim 1, further comprising, in response to the occurrence of the event, performing provisioning of identities of permitted connections.

14. A non-transitory computer-readable storage medium having computer-readable code thereon for facilitating out-of-band monitoring and provisioning, the medium including instructions executable by one or more processors to perform operations, the operations comprising:

determining, at a base station in a cellular access network, the base station configured to use a coordination server and a first core network for providing network access to user equipments (UEs), an occurrence of an event regarding a communication problem related to the base station;

sending an out-of-band message, via an embedded UE module coupled to the base station attached to a second core network, to the coordination server, based on the occurrence of the event at the base station;

updating, at the coordination server, a stored status for the base station, the instructions thereby enabling a status of the base station to be updated at the coordination server via an out-of-band message; and in response to the occurrence of the event, instructing, via a second out-of-band message, the base station to enable a closed bubble network with a configuration previously stored at the base station.

15. The non-transitory computer-readable storage medium of claim 14, wherein the event comprises at least one of a power out condition related to the base station or a lost connection between the base station and another device.

16. The non-transitory computer-readable storage medium of claim 14, the medium including instructions for performing operations wherein the out-of-band message comprises a Short Message Service (SMS) message.

* * * * *